(12) United States Patent
Ma

(10) Patent No.: US 11,106,020 B2
(45) Date of Patent: Aug. 31, 2021

(54) LENS MODULE AND ELECTRONIC DEVICE

(71) Applicant: AAC Optics Solutions Pte. Ltd., Singapore (SG)

(72) Inventor: Jie Ma, Shenzhen (CN)

(73) Assignee: ACC Optics Solutions Pte. Ltd., Singapore (SG)

( * ) Notice: Subject to any disclaimer, the term of this patent is extended or adjusted under 35 U.S.C. 154(b) by 141 days.

(21) Appl. No.: 16/706,733

(22) Filed: Dec. 7, 2019

(65) Prior Publication Data

US 2020/0209597 A1 Jul. 2, 2020

(30) Foreign Application Priority Data

Dec. 29, 2018 (CN) .......................... 201822273957.X

(51) Int. Cl.
| | | |
|---|---|---|
| *G02B 7/00* | (2021.01) | |
| *G02B 15/14* | (2006.01) | |
| *G02B 3/04* | (2006.01) | |
| G02B 23/24 | (2006.01) | |
| G02B 13/18 | (2006.01) | |
| G02B 13/00 | (2006.01) | |

(52) U.S. Cl.
CPC .............. *G02B 15/14* (2013.01); *G02B 3/04* (2013.01); *G02B 7/003* (2013.01); *G02B 13/001* (2013.01); *G02B 13/0045* (2013.01); *G02B 13/18* (2013.01); *G02B 23/2476* (2013.01)

(58) Field of Classification Search
CPC .. G02B 13/0045; G02B 13/18; G02B 13/001; G02B 3/04; G02B 15/14; G02B 7/003; G02B 23/2476

USPC ......... 359/683, 713, 694–706, 819, 821–830
See application file for complete search history.

(56) References Cited

U.S. PATENT DOCUMENTS

| | | | | |
|---|---|---|---|---|
| 10,648,853 | B2 * | 5/2020 | Wan ....................... | G02B 7/021 |
| 2013/0027787 | A1 * | 1/2013 | Yen ..................... | G02B 13/0045 359/763 |
| 2013/0027788 | A1 * | 1/2013 | Yen ..................... | G02B 13/0045 359/763 |

(Continued)

FOREIGN PATENT DOCUMENTS

| | | | |
|---|---|---|---|
| CN | 203811873 | B1 | 9/2014 |
| CN | 208026959 | B1 | 10/2018 |

(Continued)

*Primary Examiner* — Evelyn A Lester
(74) *Attorney, Agent, or Firm* — W&G Law Group LLP

(57) ABSTRACT

The present disclosure provides a lens module and an electronic device. The lens module includes a lens barrel, a first lens and a second lens accommodated in the lens barrel. The first lens includes a first optical portion and a first supporting portion wound around a periphery of the first optical portion, the second lens includes a second optical portion corresponding to the first optical portion and a second supporting portion wound around a periphery of the second optical portion. An image side of the first supporting portion is provided with a first inclined surface, and an object side of the second supporting portion is provided with a second inclined surface for adhering with the first inclined surface. The lens module of the present disclosure can improve the assembly precision of the first lens and the second lens, and thereby improving the imaging quality of the lens module.

18 Claims, 3 Drawing Sheets

(56) References Cited

U.S. PATENT DOCUMENTS

| | | | | |
|---|---|---|---|---|
| 2014/0177079 A1* | 6/2014 | Kim | ........................ | G02B 7/023 |
| | | | | 359/793 |
| 2015/0219871 A1* | 8/2015 | Kim | ........................ | G02B 7/021 |
| | | | | 359/793 |
| 2015/0241656 A1* | 8/2015 | Choi | .................. | G02B 13/0045 |
| | | | | 359/738 |
| 2015/0260940 A1* | 9/2015 | Yan | ........................ | G02B 7/021 |
| | | | | 359/793 |
| 2015/0301303 A1* | 10/2015 | Kim | ..................... | B32B 37/142 |
| | | | | 359/819 |
| 2016/0161699 A1* | 6/2016 | Kim | ..................... | G02B 13/001 |
| | | | | 359/784 |
| 2017/0075109 A1* | 3/2017 | Chou | ..................... | G02B 5/208 |
| 2017/0176649 A1* | 6/2017 | Chang | ................ | G02B 13/0045 |
| 2018/0164530 A1* | 6/2018 | Wei | ........................ | G02B 7/025 |
| 2020/0158988 A1* | 5/2020 | Feng | ..................... | G02B 13/18 |
| 2020/0166726 A1* | 5/2020 | Wang | ..................... | G02B 7/021 |
| 2020/0233176 A1* | 7/2020 | Feng | ........................ | G02B 7/04 |
| 2020/0409021 A1* | 12/2020 | Wang | ..................... | G02B 7/026 |
| 2020/0409108 A1* | 12/2020 | Ma | ........................ | G02B 7/021 |
| 2020/0409109 A1* | 12/2020 | Ma | ........................ | G02B 7/026 |
| 2020/0409111 A1* | 12/2020 | Ma | ..................... | H04N 5/2254 |
| 2021/0003749 A1* | 1/2021 | Wei | ........................ | G02B 5/003 |

FOREIGN PATENT DOCUMENTS

| | | | |
|---|---|---|---|
| CN | 209390172 U | * | 9/2019 |
| JP | 2009098614 A1 | | 5/2009 |
| JP | 2012083439 A1 | | 4/2012 |
| JP | 2015176149 A1 | | 10/2015 |

* cited by examiner

LENS MODULE AND ELECTRONIC DEVICE

TECHNICAL FIELD

The present disclosure relates to the field of optical imaging technologies, and more particularly to a lens module and an electronic device using the same.

BACKGROUND

In recent years, with the development of imaging technologies and the rise of electronic products with imaging function, optical lens modules have been widely used in various products. For some lens modules with a small head, due to the limitation of the head size, an outer diameter of a first lens near an object side can only be made small to ensure a thickness of a lens barrel wall. Due to the small outer diameter and the limitation of the lens size, an inner side wall of the lens barrel has no space to make bumpy ridge joining, which cannot ensure that the optical axis of the first lens close to the object side coincides with an optical axis of a second lens, resulting in poor assembly precision of the first lens and the second lens, and affecting the imaging quality of the lens module.

Therefore, it is necessary to provide a lens module to solve the problem that the existing lens module has poor assembly precision of the first lens and the second lens, which affects the imaging quality of the lens module.

DETAILED DESCRIPTION

The present disclosure is further illustrated hereinafter with reference to the drawings and embodiments.

Figure 1:
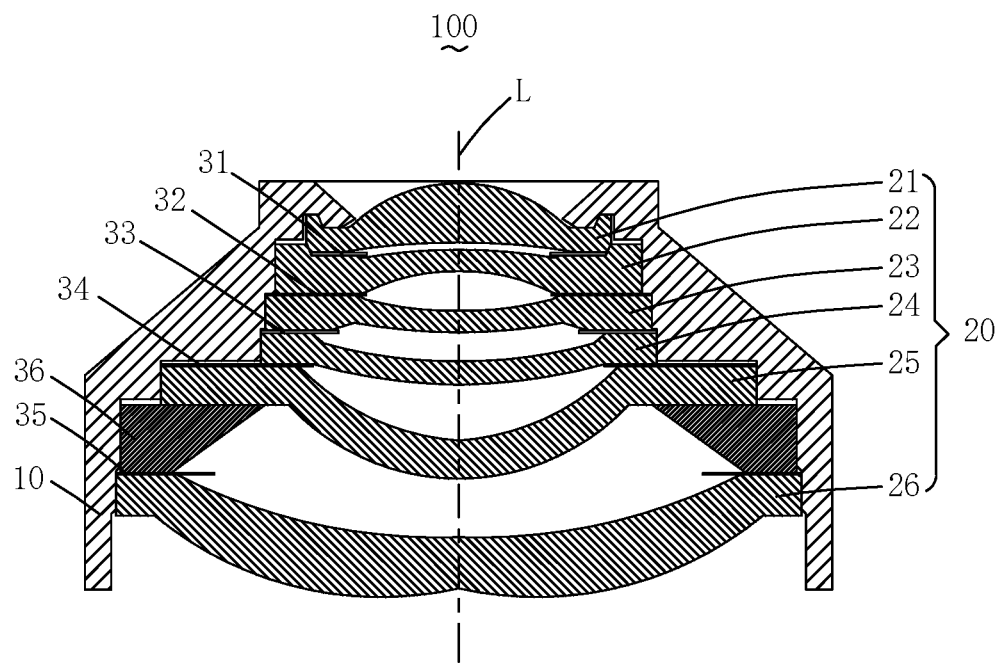
FIG. 1 is a structure diagram of a lens module provided by an embodiment of the present disclosure.

Referring to FIG. 1, an embodiment of the present disclosure provides a lens module 100, including a lens barrel 10 and a lens group 20 having an optical axis L accommodated in the lens barrel 10. The lens group 20 includes a first lens 21, a second lens 22, a third lens 23, a fourth lens 24, a fifth lens 25 and a sixth lens stacked in sequence from an object side to an image side. The lens module 100 further includes a first shade 31 disposed between the first lens 21 and the second lens 22, a second shade 32 disposed between the second lens 22 and the third lens 23, a third shade 33 disposed between the third lens 23 and the fourth lens 24, a fourth shade 34 disposed between the fourth lens 24 and the fifth lens 25, as well as a shielding plate 36 and a fifth shade 35 stacked in sequence between the fifth lens 25 and the sixth lens 26 from the object side to the image side. On one hand, the shielding plate 36 is used to absorb false light generated between the fifth lens 25 and the sixth lens 26 to improve the imaging quality of the lens module 100, and on the other hand, the shielding plate 36 is used to adjust a distance between the fifth lens 25 and the sixth lens 26. It is understood that the fifth shade 35 and the shielding plate 36 are not limited to being disposed between the fifth lens 25 and the sixth lens 26. The fifth shade 35 and the shielding plate 36 may also be disposed between any other two adjacent lenses according to actual needs.

It should be noted that the lens group 20 is not limited to including the first lens 21, the second lens 22, the third lens 23, the fourth lens 24, the fifth lens 25 and the sixth lens 26 mentioned above. For example, the lens group 20 is configured to include the first lens 21 and the second lens 22 above, or include the first lens 21, the second lens 22 and the third lens 23 above, or include the first lens 21, the second lens 22, the third lens 23 and the fourth lens 24 above, or include the first lens 21, the second lens 22, the third lens 23, the fourth lens 24 and the fifth lens 25 above, and may even include more than six lenses, depending on the actual design needs.

Figure 2:
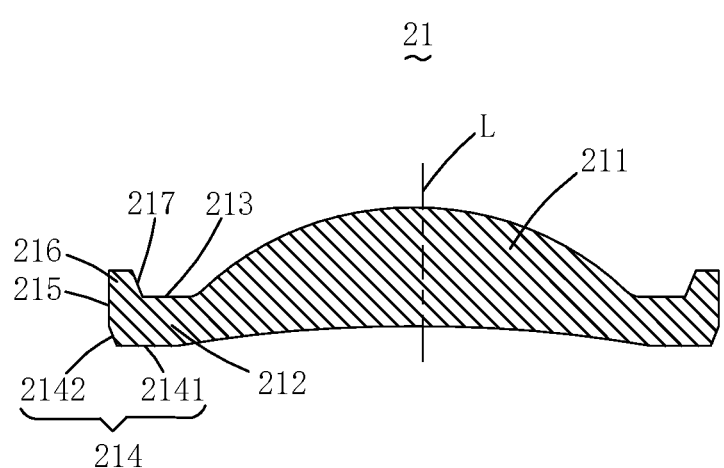
FIG. 2 is a sectional view of the first lens.
Figure 3:
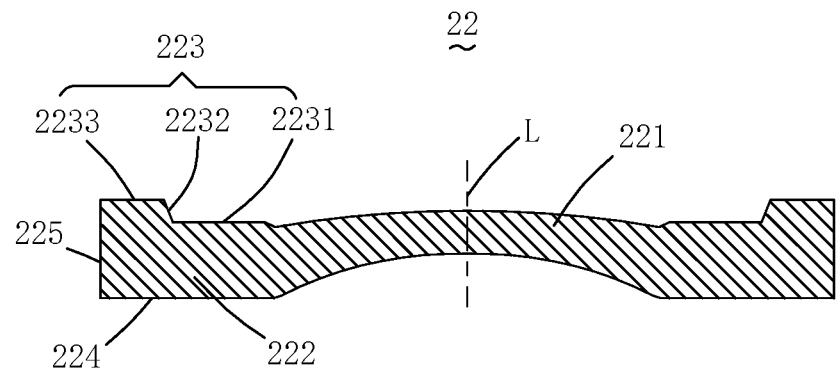
FIG. 3 is a sectional view of the second lens.
Figure 4:
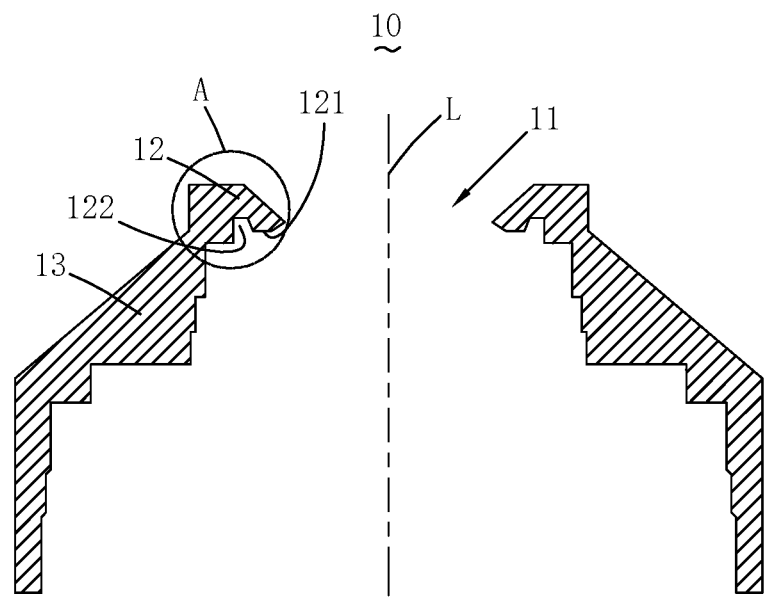
FIG. 4 is a sectional view of the lens barrel.
Figure 5:
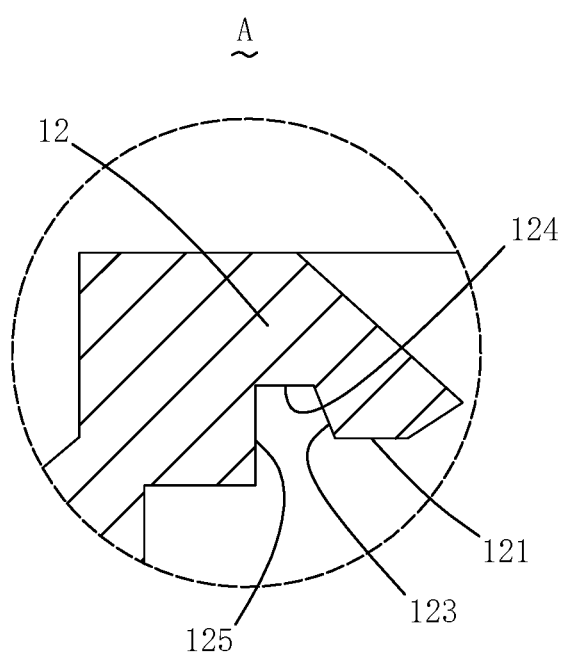
FIG. 5 is a partial enlarged drawing of portion A in FIG. 4.

Referring to FIG. 2 and FIG. 3, as an improvement of the embodiment, the first lens 21 includes a first optical portion 211 and a first supporting portion 212 wound around a periphery of the first optical portion 211, and the second lens 22 includes a second optical portion 221 corresponding to the first optical portion 211 and a second supporting portion 222 wound around a periphery of the second optical portion 221. The first supporting portion 212 includes a first object-side surface 213, a first image-side surface 214 disposed opposite to the first object-side surface 213, and a first side wall 215 connecting the first object-side surface 213 and the first image-side surface 214. The second supporting portion 222 includes a second object-side surface 223, a second image-side surface 224 disposed opposite to the second object-side surface 223, and a second side wall 225 connecting the second object-side surface 223 and the second image-side surface 224. The first image-side surface 214 includes a first extending surface 2141 extending from the first optical portion 211 towards a direction far away from the optical axis L, and a first inclined surface 2142 connecting the first extending surface 2141 and the first side wall 215. The first inclined surface 2142 inclines towards the direction far away from the optical axis L from the image side towards the object side. The second object-side surface 223 includes a second extending surface 2231 extending from the second optical portion 221 towards the direction far away from the optical axis, a second inclined surface 2232 extending from the second extending surface 2231 towards the object side, and a connecting surface 2233 connecting the second inclined surface 2232 and the second side wall 225, and the second inclined surface 2232 obliquely extends towards the direction far away from the optical axis L. The first inclined surface 2142 is abutted against the second inclined surface 2232, and a distance from the first side wall 215 to the optical axis L is less than a distance from the second side wall 225 to the optical axis L.

According to the design mode, by arranging the first inclined surface 2142 on the first lens 21, arranging the second inclined surface 2232 on the second lens 22, and abutting the first inclined surface 2142 against the second inclined surface 2232, the optical axis of the first lens 21 can coincide with the optical axis of the second lens 22 through the matching of the first inclined surface 2142 and the second inclined surface 2232 when the first lens 21 and the second lens 22 are assembled, thus improving the assembly precision of the first lens 21 and the second lens 22, and thereby improving the imaging quality of the lens module 100.

Referring to FIG. 2 to FIG. 5, as an improvement of the embodiment, the lens barrel 10 includes a first barrel wall 12 provided with a light through hole 11 and a second barrel wall 13 extending from the first barrel wall 12 towards the image side. The first barrel wall 12 has an inner wall surface 121 far away from the object side, the inner wall surface 121 is concavely provided with a recess 122 towards the object side, and the first object-side surface 213 is convexly provided with a bulge 216 clamped with the recess 122. According to the design mode, by concavely arranging the recess 122 on the first barrel wall 12, and concavely arranging the bulge 216 clamped in the recess 122 into one side of the first supporting portion 213 towards the first barrel wall 12, the first lens 21 can be located and installed on the lens barrel 10, so that the optical axis of the first lens 21 coincides with an optical axis of the light through hole 11, and light passing through the light through hole 11 can pass through the first lens 21 at a better angle, thus improving the imaging quality of the lens module 100.

As an improvement of the embodiment, the recess 122 is formed by enclosing a first recess side wall 123, a recess bottom wall 124 and a second recess side wall 125. The first recess side wall 123, the recess bottom wall 124 and the second recess side wall 125 are disposed in sequence from inside to outside along a radial direction of the lens barrel 10. The first recess side wall 123 extends to the recess bottom wall 124 in a manner of gradually distancing from the optical axis L, and the bulge 216 has a third inclined surface 217 jointed with the first recess side wall 123. According to the design mode, by obliquely arranging the first recess side wall 123 of the recess 122, and arranging the third inclined surface 217 jointed with the first recess side wall on the bulge 216, the optical axis of the first lens 21 can be further ensured to coincide with the optical axis of the light through hole 11 when the first lens 21 is installed on the lens barrel 10, thus improving the imaging quality of the lens module 100.

As an improvement of the embodiment, the recess 122 is an annular recess surrounding the optical axis L. The bulge 216 is an annular bulge surrounding the optical axis. It is understood that the recess 122 is not limited to the form of the annular recess. For example, the recess 122 is configured to include a plurality of sub-recesses disposed around the optical axis L, and the bulge 216 can also be configured to include a plurality of lug bosses corresponding to the sub-recesses, as long as the configured bulge 216 is matched with the recess 122 to enable the optical axis of the first lens 21 to coincide with the optical axis of the second lens 22.

As an improvement of the embodiment, the first extending surface 2141 is spaced apart from the second extending surface 2231, and the first shade 31 is sandwiched between the first extending surface 2141 and the second extending surface 2231.

The present disclosure further provides an electronic device including the lens module 100 mentioned above. Preferably, the electronic device is a mobile phone or a camera.

The description above is merely the embodiments of the present disclosure, and it should be pointed out that those of ordinary skills in the art may make improvements without departing from the concept of the present disclosure, and all these improvements shall belong to the scope of protection of the present disclosure.

What is claimed is:

1. A lens module, comprising
a lens barrel, and
a lens group having an optical axis accommodated in the lens barrel;
wherein the lens group comprises a first lens and a second lens stacked from an object side to an image side,
the first lens comprises a first optical portion and a first supporting portion wound around a periphery of the first optical portion, and
the second lens comprises a second optical portion corresponding to the first optical portion and a second supporting portion wound around a periphery of the second optical portion;
the first supporting portion comprises a first object-side surface, a first image-side surface disposed opposite to the first object-side surface, and a first side wall connecting the first object-side surface and the first image-side surface;
the second supporting portion comprises a second object-side surface, a second image-side surface disposed opposite to the second object-side surface, and a second side wall connecting the second object-side surface and the second image-side surface;
wherein the first image-side surface comprises a first extending surface extending from the first optical portion towards a direction far away from the optical axis, and a first inclined surface connecting the first extending surface and the first side wall;
the first inclined surface inclines towards a direction far away from the optical axis from the image side towards the object side,
the second object-side surface comprises a second extending surface extending from the second optical portion towards the direction far away from the optical axis, a second inclined surface extending from the second extending surface towards the object side, and a connecting surface connecting the second inclined surface and the second side wall;
the second inclined surface extends obliquely towards the direction far away from the optical axis; and
the first inclined surface is abutted against the second inclined surface, and
a distance from the first side wall to the optical axis is less than a distance from the second side wall to the optical axis.

2. The lens module according to claim 1, wherein the lens barrel comprises a first barrel wall provided with a light through hole and a second barrel wall extending from the first barrel wall towards the image side,
the first barrel wall has an inner wall surface far away from the object side,
the inner wall surface is concavely provided with a recess towards the object side, and
the first object-side surface is convexly provided with a bulge clamped with the recess.

3. The lens module according to claim 2, wherein the recess is formed by enclosing a first recess side wall, a recess bottom wall and a second recess side wall,
the first recess side wall, the recess bottom wall and the second recess side wall are disposed from inside to outside along a radial direction of the lens barrel,
the first recess side wall extends to the recess bottom wall in a manner of gradually moving away from the optical axis, and
the bulge has a third inclined surface jointed with the first recess side wall.

4. The lens module according to claim 2, wherein the recess is an annular recess disposed surrounding the optical axis.

5. The lens module according to claim 1, wherein the first extending surface is spaced apart from the second extending surface, and the lens module further comprises a first shade sandwiched between the first extending surface and the second extending surface.

6. The lens module according to claim 2, wherein the first extending surface is spaced apart from the second extending surface, and
the lens module further comprises a first shade sandwiched between the first extending surface and the second extending surface.

7. The lens module according to claim 3, wherein the first extending surface is spaced apart from the second extending surface, and
the lens module further comprises a first shade sandwiched between the first extending surface and the second extending surface.

8. The lens module according to claim 4, wherein the first extending surface is spaced apart from the second extending surface, and
the lens module further comprises a first shade sandwiched between the first extending surface and the second extending surface.

9. The lens module according to claim 5, wherein the lens module further comprises a second shade, a third lens, a third shade, a fourth lens, a fourth shade, a fifth lens, a fifth shade and a sixth lens arranged at an image side of the second lens and stacked in sequence.

10. The lens module according to claim 9, wherein the lens module further comprises a shielding plate, and the shielding plate and the fifth shade are stacked between the fifth lens and the sixth lens from the object side to the image side.

11. An electronic device, comprising a lens module,
the lens module, comprising
a lens barrel, and
a lens group having an optical axis accommodated in the lens barrel;
wherein the lens group comprises a first lens and a second lens stacked from an object side to an image side,
the first lens comprises a first optical portion and a first supporting portion wound around a periphery of the first optical portion, and
the second lens comprises a second optical portion corresponding to the first optical portion and a second supporting portion wound around a periphery of the second optical portion;
the first supporting portion comprises a first object-side surface, a first image-side surface disposed opposite to the first object-side surface, and a first side wall connecting the first object-side surface and the first image-side surface;
the second supporting portion comprises a second object-side surface, a second image-side surface disposed opposite to the second object-side surface, and a second side wall connecting the second object-side surface and the second image-side surface;
wherein the first image-side surface comprises a first extending surface extending from the first optical portion towards a direction far away from the optical axis, and a first inclined surface connecting the first extending surface and the first side wall;

the first inclined surface inclines towards a direction far away from the optical axis from the image side towards the object side,
the second object-side surface comprises a second extending surface extending from the second optical portion towards the direction far away from the optical axis, a second inclined surface extending from the second extending surface towards the object side, and a connecting surface connecting the second inclined surface and the second side wall;
the second inclined surface extends obliquely towards the direction far away from the optical axis; and
the first inclined surface is abutted against the second inclined surface, and
a distance from the first side wall to the optical axis is less than a distance from the second side wall to the optical axis.

12. The electronic device according to claim 11, wherein the electronic device is a mobile phone or a camera.

13. The electronic device according to claim 11, wherein the lens barrel comprises a first barrel wall provided with a light through hole and a second barrel wall extending from the first barrel wall towards the image side,
the first barrel wall has an inner wall surface far away from the object side,
the inner wall surface is concavely provided with a recess towards the object side, and
the first object-side surface is convexly provided with a bulge clamped with the recess.

14. The electronic device according to claim 13, wherein the recess is formed by enclosing a first recess side wall, a recess bottom wall and a second recess side wall,
the first recess side wall, the recess bottom wall and the second recess side wall are arranged from inside to outside along a radial direction of the lens barrel,
the first recess side wall extends to the recess bottom wall in a manner of gradually moving away from the optical axis, and
the bulge has a third inclined surface jointed with the first recess side wall.

15. The electronic device according to claim 13, wherein the recess is an annular recess disposed surrounding the optical axis.

16. The electronic device according to claim 11, wherein the first extending surface is spaced apart from the second extending surface, and
the lens module further comprises a first shade sandwiched between the first extending surface and the second extending surface.

17. The electronic device according to claim 16, wherein the lens module further comprises a second shade, a third lens, a third shade, a fourth lens, a fourth shade, a fifth lens, a fifth shade and a sixth lens arranged at an image side of the second lens and stacked in sequence.

18. The electronic device according to claim 17, wherein the lens module further comprises a shielding plate, and the shielding plate and the fifth shade are stacked between the fifth lens and the sixth lens from the object side to the image side.

* * * * *